United States Patent
Han et al.

(10) Patent No.: US 11,381,817 B2
(45) Date of Patent: Jul. 5, 2022

(54) VIEWPORT-BASED TRANSCODING FOR IMMERSIVE VISUAL STREAMS

(71) Applicant: AT&T Intellectual Property I, L.P., Atlanta, GA (US)

(72) Inventors: Bo Han, Bridgewater, NJ (US); Tan Xu, Bridgewater, NJ (US); Zhengye Liu, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/580,903

(22) Filed: Sep. 24, 2019

(65) Prior Publication Data

US 2021/0092371 A1    Mar. 25, 2021

(51) Int. Cl.
| | |
|---|---|
| H04N 19/597 | (2014.01) |
| H04N 19/167 | (2014.01) |
| H04N 19/119 | (2014.01) |
| H04N 19/20 | (2014.01) |
| G06N 20/00 | (2019.01) |
| H04N 19/176 | (2014.01) |

(Continued)

(52) U.S. Cl.
CPC .......... *H04N 19/119* (2014.11); *G06N 5/04* (2013.01); *G06N 20/00* (2019.01); *H04N 19/162* (2014.11); *H04N 19/176* (2014.11); *H04N 19/20* (2014.11); *H04N 19/597* (2014.11)

(58) Field of Classification Search
CPC .. H04N 19/119; H04N 19/162; H04N 19/176; H04N 19/20; H04N 19/597; G06N 20/00; G06N 5/04
USPC ........................................ 375/240.02, 240.03
See application file for complete search history.

(56) References Cited

U.S. PATENT DOCUMENTS

| | | | |
|---|---|---|---|
| 2017/0237983 A1* | 8/2017 | Adsumilli | H04N 21/23439 375/240.03 |
| 2017/0251208 A1* | 8/2017 | Adsumilli | H04N 19/597 |
| 2017/0366812 A1* | 12/2017 | Abbas | H04N 13/00 |

(Continued)

FOREIGN PATENT DOCUMENTS

WO    WO-2021074005 A1 *    4/2021

OTHER PUBLICATIONS

Hamza, Ahmed and Mohamed Hefeeda. "Adaptive streaming of interactive free viewpoint videos to heterogeneous clients." MMSys '16 (2016). 12 pages. https://api.semanticscholar.org/CorpusID:15656998.

(Continued)

*Primary Examiner* — Albert Kir

(57) ABSTRACT

In one example, a processing system including at least one processor may obtain a predicted viewport of a mobile computing device for an immersive visual stream, identify a first plurality of blocks of a frame of the immersive visual stream that are associated with the predicted viewport, encode the first plurality of blocks at a first encoding quality level, and encode a second plurality of blocks of the frame at a second encoding quality level, where the second encoding quality level is associated with a lesser visual quality as compared to the first encoding quality level and where the second plurality of blocks are outside of the predicted viewport. The processing system may then transmit the frame having the first plurality of blocks encoded at the first encoding quality level and the second plurality of blocks encoded at the second encoding quality level to the mobile computing device.

20 Claims, 4 Drawing Sheets

(51) Int. Cl.
  G06N 5/04 (2006.01)
  H04N 19/162 (2014.01)

(56) References Cited

U.S. PATENT DOCUMENTS

| | | | | |
|---|---|---|---|---|
| 2019/0297332 | A1* | 9/2019 | Zheng | H04N 19/174 |
| 2020/0092571 | A1* | 3/2020 | Tourapis | H04N 19/167 |
| 2020/0177927 | A1* | 6/2020 | Yang | H04N 21/84 |
| 2020/0204810 | A1* | 6/2020 | Xie | H04N 19/146 |
| 2020/0226792 | A1* | 7/2020 | Wang | H04N 19/597 |
| 2021/0021806 | A1* | 1/2021 | He | H04N 21/44209 |
| 2021/0084332 | A1* | 3/2021 | Duanmu | H04N 19/14 |
| 2021/0092418 | A1* | 3/2021 | Han | G06T 3/0087 |
| 2022/0021864 | A1* | 1/2022 | Mate | H04N 19/597 |

OTHER PUBLICATIONS

Intel, "Encoding Video at the Edge with Intel® Xeon® Processors" Solution Brief. 2017. 4 pages.

Kobbelt, Leif & Botsch, Mario. (2004). A Survey of Point-Based Techniques in Computer Graphics. Computer. 28. 801-814. 10.1016/j.cag.2004.08.009. Dec. 2004Computers & Graphics 28(6):801-814; 23 pages. https://www.researchgate.net/publication/200018736_A_Survey_of_Point-Based_Techniques_in_Computer_Graphics.

Kowalski, Marek & Naruniec, Jacek & Daniluk, Michal. (2015). Livescan3D: A Fast and Inexpensive 3D Data Acquisition System for Multiple Kinect v2 Sensors. 318-325. 10.1109/3DV.2015.43. Conference: 2015 International Conference on 3D Vision (3DV), Oct. 2015; 9 pages.

Le, Tuan & Jeong, JongBeom & Ryu, Eun-Seok. (2019). Efficient Transcoding and Encryption for Live 360 CCTV System. Applied Sciences. 9. 760. 10.3390/app9040760. Feb. 2019, Applied Sciences 9(4):760; 18 pages. https://www.researchgate.net/publication/331278993_Efficient_Transcoding_and_Encryption_for_Live_360_CCTV_System.

Maglo, Adrien & Lavoué, Guillaume & Dupont, Florent & Hudelot, Céline. (2015). 3D Mesh Compression: Survey, Comparisons, and Emerging Trends. Apr. 2015; 40 pages. https://www.researchgate.net/publication/280047242_3D_Mesh_Compression_Survey_Comparisons_and_Emerging_Trends.

Mangiante, Simone & Kias, Guenter & Navon, Amit & Zhuang, Guanhua & Ran, Ju & Silva, Marco. (2017). VR is on the Edge: How to Deliver 360° Videos in Mobile Networks. 30-35. 10.1145/3097895.3097901. Aug. 2017, Conference: the Workshop; 7 pages. https://www.researchgate.net/publication/319049968_VR_is_on_the_Edge_How_to_Deliver_360_Videos_in_Mobile_Networks.

Qian, Feng & Ji, Lusheng & Han, Bo & Gopalakrishnan, Vijay. (2016). Optimizing 360 video delivery over cellular networks. 1-6. 10.1145/2980055.2980056. Oct. 2016, Conference: the 5th Workshop; 6 pages. https://www.researchgate.net/publication/308571053_Optimizing_360_video_delivery_over_cellular_networks.

Qian, Feng & Han, Bo & Xiao, Qingyang & Gopalakrishnan, Vijay. (2018). Flare: Practical Viewport-Adaptive 360-Degree Video Streaming for Mobile Devices. 99-114. 10.1145/3241539.3241565. Oct. 2018, Conference: the 24th Annual International Conference; 16 pages. https://www.researchgate.net/publication/328322475_Flare_Practical_Viewport-Adaptive_360-Degree_Video_Streaming_for_Mobile_Devices.

Schnabel, Ruwen & Klein, Reinhard. (2006). Octree-based Point-Cloud Compression.. Eurographics Symposium on Point-Based Graphics. 111-120. 10.2312/SPBG/SPBG06/111-120. Jan. 2006, Conference: Symposium on Point Based Graphics, Boston, Massachusetts, USA, 2006. Proceedings; 11 pages. https://www.researchgate.net/publication/221571163_Octree-based_Point-Cloud_Compression.

* cited by examiner

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 5 | 5 | 1 | 1 | 1 |
| 1 | 1 | 5 | 5 | 5 | 5 | 1 | 1 |
| 1 | 1 | 5 | 5 | 5 | 5 | 1 | 1 |
| 1 | 1 | 5 | 5 | 5 | 5 | 1 | 1 |
| 1 | 1 | 5 | 5 | 5 | 5 | 1 | 1 |
| 1 | 1 | 1 | 5 | 5 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |
| 1 | 1 | 1 | 1 | 1 | 1 | 1 | 1 |

215

220

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 2 | 2 | 2 | 2 | 1 | 1 |
| 1 | 2 | 3 | 3 | 3 | 3 | 2 | 1 |
| 1 | 3 | 4 | 5 | 5 | 4 | 3 | 1 |
| 2 | 3 | 5 | 5 | 5 | 5 | 3 | 2 |
| 2 | 3 | 5 | 5 | 5 | 5 | 3 | 2 |
| 2 | 3 | 5 | 5 | 5 | 5 | 3 | 2 |
| 2 | 3 | 5 | 5 | 5 | 5 | 3 | 2 |
| 2 | 3 | 4 | 5 | 5 | 4 | 3 | 2 |
| 1 | 2 | 3 | 4 | 4 | 4 | 2 | 1 |
| 1 | 2 | 3 | 3 | 3 | 3 | 2 | 1 |
| 1 | 1 | 2 | 2 | 2 | 2 | 1 | 1 |
| 1 | 1 | 1 | 1 | 1 | 1 | 1 | 1 |
| 1 | 1 | 1 | 1 | 1 | 1 | 1 | 1 |

225

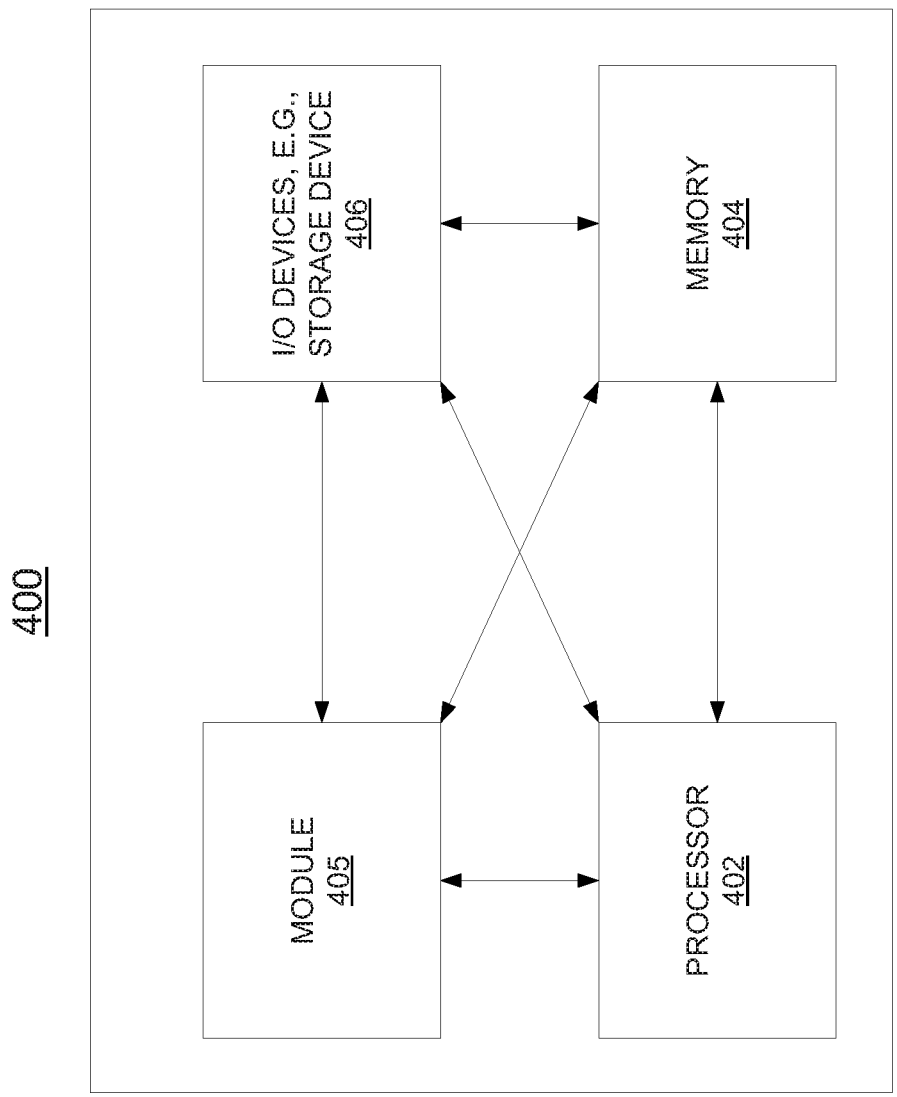

VIEWPORT-BASED TRANSCODING FOR IMMERSIVE VISUAL STREAMS

The present disclosure relates generally to immersive visual streaming, and more particularly to devices, non-transitory computer-readable media, and methods for encoding a first plurality of blocks of a frame of an immersive visual stream associated with a predicted viewport at a first encoding quality level and encoding a second plurality of blocks of the frame at a second encoding quality level.

BRIEF DESCRIPTION OF THE DRAWINGS

The teachings of the present disclosure can be readily understood by considering the following detailed description in conjunction with the accompanying drawings, in which:

FIG. 2 illustrates examples of two-tier and multi-tier frame block encoding, in accordance with the present disclosure;

FIG. 4 illustrates a high level block diagram of a computing device specifically programmed to perform the steps, functions, blocks and/or operations described herein.

To facilitate understanding, identical reference numerals have been used, where possible, to designate identical elements that are common to the figures.

DETAILED DESCRIPTION

Figure 1:
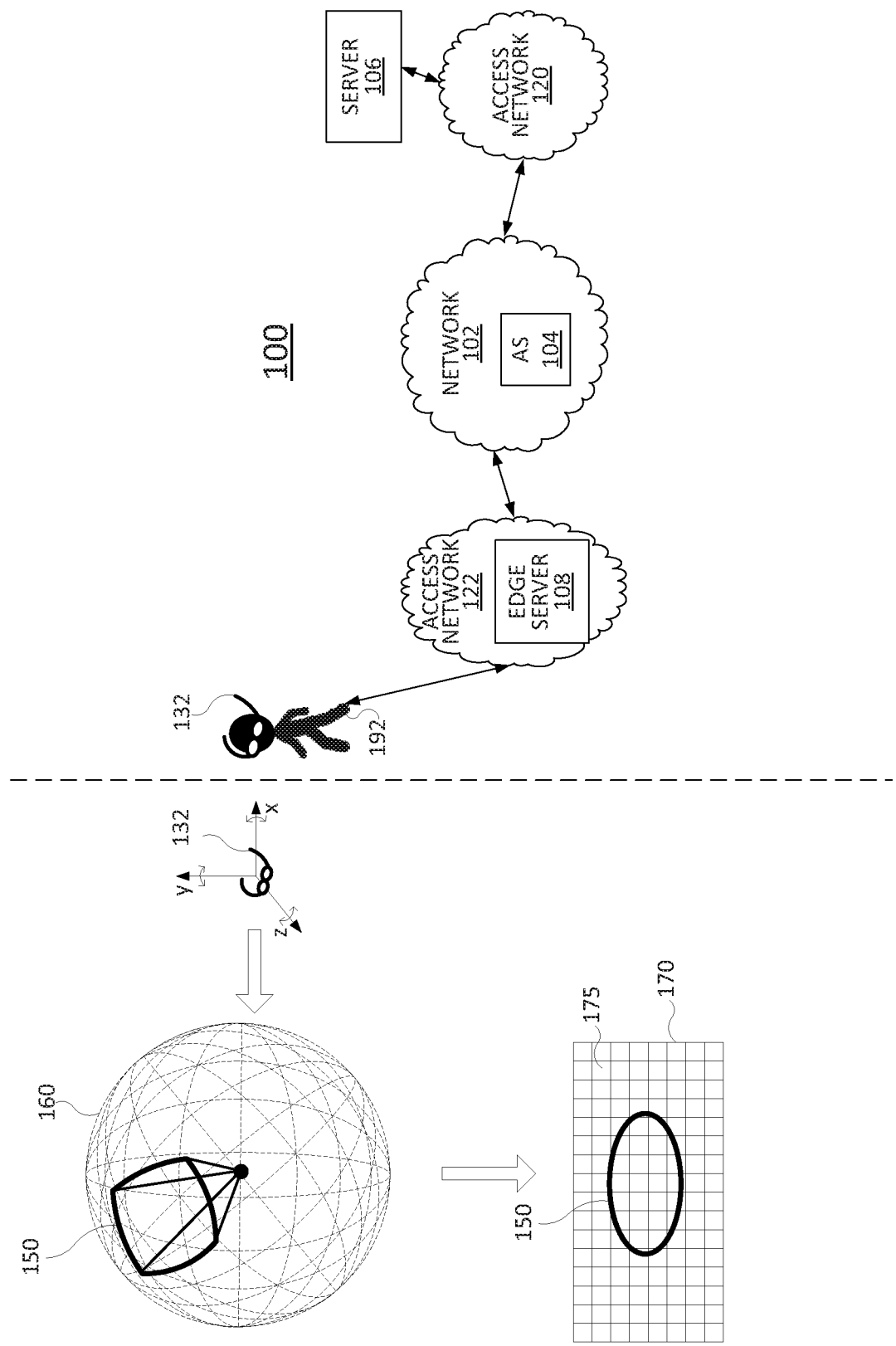
FIG. 1 illustrates an example network related to the present disclosure.

In one example, the present disclosure describes a device, computer-readable medium, and method for encoding a first plurality of blocks of a frame of an immersive visual stream associated with a predicted viewport at a first encoding quality level and encoding a second plurality of blocks of the frame at a second encoding quality level. For instance, a processing system including at least one processor may obtain a predicted viewport of a mobile computing device for an immersive visual stream, identify a first plurality of blocks of a frame of the immersive visual stream that are associated with the predicted viewport, encode the first plurality of blocks of the frame at a first encoding quality level, and encode a second plurality of blocks of the frame at a second encoding quality level, where the second encoding quality level is associated with a lesser visual quality as compared to the first encoding quality level and where the second plurality of blocks is outside of the predicted viewport. The processing system may then transmit the frame having the first plurality of blocks encoded at the first encoding quality level and the second plurality of blocks encoded at the second encoding quality level to the mobile computing device.

Examples of the present disclosure provide a viewport-guided scheme to transcode visual streams, and, in particular, immersive visual streams, e.g., at the network edge. Although examples of the present disclosure are described primarily in connection with 360-degree panoramic video streaming, the present examples may similarly be applied to non-360-degree video (including "regular"/non-immersive video), volumetric video, and so forth. In one example, the present disclosure provides region-of-interest (RoI) encoding in accordance with machine learning-based viewport prediction. RoI encoding offers a higher visual quality for specific area(s) of interest within a video frame. Quality levels may be reduced for other areas of the frame that the viewer will not consume (for 360-degree videos) and/or may not pay attention to (e.g., for "regular" and/or non-360-degree videos). When applied to 360-degree video streaming, the RoI may be identified through viewport prediction (e.g., based on a deep learning model or other predictive model trained using a series of historical viewports, or a trajectory). For regular video, the RoI may be predicted through gaze tracking technologies. To accommodate errors in future viewport prediction and to minimize the impact on user-perceived quality of experience (QoE), the present disclosure may utilize a multi-tier encoding scheme that gradually reduces the video encoding quality level by considering the distance of to-be-encoded video content from the center of the predicted viewport, the predicted viewport trajectory, and the prediction accuracy.

In a 360-degree video system, a user wearing a display headset can freely change the viewing direction. Technically, the user is situated in the center of a virtual sphere, and the panoramic contents may be downloaded from video servers and projected onto the sphere (e.g., using equirectangular projection). The user's viewport (visible area) is determined by the viewing direction (in latitude/longitude) and the field-of-view (FoV) of the headset, e.g., in real time or near-real time. The FoV defines the extent of the observable area, which may be a fixed parameter of the headset.

Maintaining QoE for 360-degree videos over bandwidth-limited links on commodity mobile devices remains challenging. First, 360-degree videos are large: under the same perceived quality, 360-degree videos have around 5× larger sizes than conventional videos. Second, 360-degree videos are complex: sophisticated projection and content representation schemes may incur high computational overhead. Third, 360-degree videos are still under-explored: there is a lack of real-world experimental studies of key aspects such as rate adaptation, QoE metrics, and cross-layer interactions (e.g., with Transmission Control Protocol and web protocols such as Hypertext Transfer Protocol (HTTP)/2).

One approach to 360-degree video streaming is monolithic streaming. Monolithic streaming delivers uniformly encoded panoramic views and is widely used by many commercial 360-degree video content providers. For more advanced schemes that perform viewport adaptation, a 360-degree video has multiple versions each having a different scene region, called quality emphasized region (QER), with a higher encoding rate. A player picks the right version based on the viewer's head orientation. One practical issue of this scheme is that it incurs significant processing and storage overhead at the server side, because a single video may be encoded into close to 100 different versions, each having a different QER.

Another approach to 360-degree video streaming is viewport-adaptive tile-based streaming in which a 360-degree video is spatially (and temporally) segmented into tiles, and only tiles overlapping with predicted FoVs are delivered. To increase the robustness, a player can also fetch the remaining tiles at lower quality, or qualities. In this scheme, each 360-degree video chunk is pre-segmented into multiple smaller units, which are called tiles. One way to generate the tiles is to evenly divide a chunk containing projected raw frames into m×n rectangles each corresponding to a tile. Suppose the projected visible area is ⊖. The client may then request the tiles from the available m×n rectangles that overlap with Θ. A tile has the same duration and number of frames as the chunk to which it belongs, but occupies a smaller spatial portion. Each tile can be independently downloaded and decoded. Note that due to projection, despite the viewer's FoV being fixed, the size of Θ and thus the number of requested tiles may vary. Compared to FoV-agnostic approaches, tiling offers significant bandwidth saving. However, this solution may require mobile devices to simultaneously decode multiple tiles. For mobile devices with limited compute resources, it may result in video stall or skipped video frames, which affect the QoE. In contrast to delivering multiple tiles with different quality levels, or pre-encoding the entire video into different versions with different high quality regions, examples of the present disclosure transcode an immersive visual stream in real time, e.g., during the streaming process at an edge server, using RoI encoding based on the prediction of future viewports.

Most of the existing lossy video encoding methods, such as MPEG-4 (Moving Picture Experts Group-4), H.264/AVC (Advanced Video Coding) and H.265/HEVC (High Efficiency Video Coding), use spatial-frequency transformation for encoding. These techniques transform, quantify, and compress a video frame into data at the sender side. The receiver then de-compresses, inversely quantifies and transforms the data back to a video frame. These encoding methods divide the frame into macro-blocks, the basic unit of compression. In addition, the quantization parameters that affect the visual quality level may be different for each of the macro-blocks within a frame, which enables RoI encoding. RoI encoding can reduce the amount of transmitted data and thus potentially also decrease the transmission latency. It should be noted that some encoding formats may further subdivide macro-blocks into sub-macro-blocks, or "micro-blocks" to provide additional granularity to the regions of encoding. In accordance with the present disclosure, in one example, viewport-adaptive encoding may be applied at the macro-block level. However, in another example, viewport-adaptive encoding may alternatively or additionally be applied at the micro-block level. In this regard, the term "block" as used herein may refer to any spatial sub-division of a frame which may comprise a unit, e.g., of a macro-block size or smaller, for application of an encoding technique. For instance, a macro-block may comprise a block or array of 16×16 pixels, 8×8 pixels, etc. In one example, a macro-block may comprise an array comprising, for instance, 16×16 luminance subsamples and 8×8 chrominance subsamples. The macro-block may further be divided into four 8×8 transform blocks. It should be noted that the present disclosure is not limited to a particular encoding methodology, block size, sampling arrangement, or the like. Thus, in other examples, different block sizes may be used, such as 32×32 pixels, 64×64 pixels, etc. However, a "block" as used herein still refers to a relatively smaller portion of a frame, e.g., compared to a "tile," such as used in tile-based adaptive immersive visual streaming systems. For instance, a "block" as used herein may comprise no more than 64×64 pixels (with regard to 360-degree video, less than 360-degree panoramic immersive video, etc.). With respect to volumetric video, a "block" may comprise a similarly sized three-dimensional set of voxels (e.g., 64×64×64, or less).

The viewport-guided transcoding of the present disclosure determines the encoding quality level(s) that will be used to encode the blocks within a frame of an immersive visual stream. In one example, the content that is predicted to be within the viewport of a user may be encoded with a higher encoding quality level. Suppose there are five encoding quality levels, from 1 to 5, with 5 being the highest one. After predicting the viewport of a future frame, encoding at encoding quality level 5 may be applied to the blocks that are associated with the predicted viewport (e.g., those that fall within or overlap the predicted viewport, and which may include in one example, blocks that may be "near" the edges of the predicted viewport. The other blocks may be encoded using a lower encoding quality level (e.g., the lowest encoding quality level 1). An example of this approach is illustrated in FIG. 2. In one example, this "two-tier" approach may be utilized when the future viewport prediction is considered to be accurate (e.g., prediction accuracy is greater than a threshold, such as greater than 80 percent accuracy, greater than 90 percent accuracy, greater than 95 percent accuracy, etc.).

However, it should be noted that the viewport prediction may not always be accurate. For instance, users may change the viewport very fast, or suddenly change the head movement direction when attracted by some interesting scene or object. Under these scenarios, the player may be presented with low quality video content since the actual viewport may fall outside the boundaries of the predicted viewport of a frame. Accordingly, in one example, the present invention utilizes a multi-tier quality level assignment of blocks, e.g., when the prediction accuracy is below a threshold accuracy. In this case, the encoding quality level(s) of blocks of the frame outside of the predicted viewport are selected considering the distance of each block to the center of the predicted viewport, the viewport trajectory, and the accuracy of viewport prediction. An example of this approach is illustrated in FIG. 2.

In one example, viewport-guided transcoding is applied at the network-edge, e.g., in an edge server. To illustrate, in one example, the edge server may collect the viewport movement traces from a client device periodically, or according to another schedule. At the client device-side, the video player may collect actual viewport data, e.g., via motion sensors for 360-degree video streaming or volumetric video streaming, or using gaze tracking for regular video streaming or non-360-degree panoramic video streaming. Upon obtaining the viewport traces, the edge server may use one or more pre-trained machine learning models (MLMs) to predict the future viewports and trajectory (e.g., which direction the viewport is moving toward). If the prediction is accurate (e.g., higher than 80%, 90%, 95%, etc.), the edge server may use a two-tier encoding quality level assignment to determine the encoding parameters for the blocks in a video frame that contains the predicted viewport (e.g., as shown in example frame encoding 210 of FIG. 2). In one example, the edge server may determine the prediction accuracy by comparing previously predicted viewports to the actual viewport information that is reported by the client device in the viewport traces. If the prediction is less accurate (e.g., at or below 80%, 90%, 95%, etc.), the edge server may use multi-tier encoding quality level assignment, e.g., by first assigning the highest encoding quality level to the blocks that overlap with the predicted viewport. In one example, the "highest" encoding quality level may be a maximum that is determined to be supportable based on an estimated network bandwidth or channel quality experienced by the client device. In other words, the edge server may be capable of providing one or more even higher encoding quality levels, which may not be used due to the network bandwidth limitations. In one example, the edge server may then assign a next highest encoding quality level to blocks on the predicted trajectory, e.g., one level lower than the encoding quality level assigned to blocks within the predicted viewport (an example is shown in example frame encoding 220 of FIG. 2) Finally, the edge server may assign encoding quality levels to remaining blocks of the frame based on their distance to the center of the viewport. In one example, the encoding quality levels are scaled with the distance and are further scaled according to the prediction accuracy. By considering the viewport movement direction (trajectory), the "center" of the viewport that is used for such calculations may be shifted toward the predicted direction when calculating the distance to each of the remaining blocks.

While viewport movement traces may be used to predict future viewports that will be treated as a RoI in a video frame, the present disclosure may also utilize video content analysis to predict the RoI. For instance, the video content analysis can be based on a saliency map and/or a heatmap. Heatmap and saliency map-based RoI identification can be conducted offline with video content and aggregated user viewing data. The saliency map and/or heatmap-identified RoIs can then be used in conjunction with a user's viewport trajectory to further increase the accuracy of future viewport prediction.

The present disclosure can also be extended to a hybrid architecture that stores only a small number of versions on the video content server that are determined by the most popular viewport trajectories. For instance, users may be guided through 360-degree videos by showing the most popular RoI in each video frame. One or two versions of the video may be stored with these most popular RoIs, and then viewport-guided transcoding in accordance with the present disclosure may be used when a user's viewport significantly deviates from these RoIs. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In accordance with the present disclosure, network 102 may include an application server (AS) 104, which may comprise a computing system or server, such as computing system 400 depicted in FIG. 4, and may be configured to provide one or more operations or functions in connection with examples of the present disclosure for encoding a first plurality of blocks of a frame of an immersive visual stream associated with a predicted viewport at a first encoding quality level and encoding a second plurality of blocks of the frame at a second encoding quality level.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. Thus, although only a single application server (AS) 104 is illustrated, it should be noted that any number of servers may be deployed, and which may operate in a distributed and/or coordinated manner as a processing system to perform operations in connection with the present disclosure.

In one example, AS 104 may comprise a centralized network-based server for immersive visual streaming. In one example, AS 104 may comprise a physical storage device (e.g., a database server), to store immersive visual streams (e.g., "regular" videos, 360-degree videos and/or non-360-degree panoramic videos, volumetric videos, etc.). AS 104 may also transmit immersive visual streams to requesting devices in accordance with the present disclosure. For ease of illustration, various additional elements of network 102 are omitted from FIG. 1.

Figure 3:
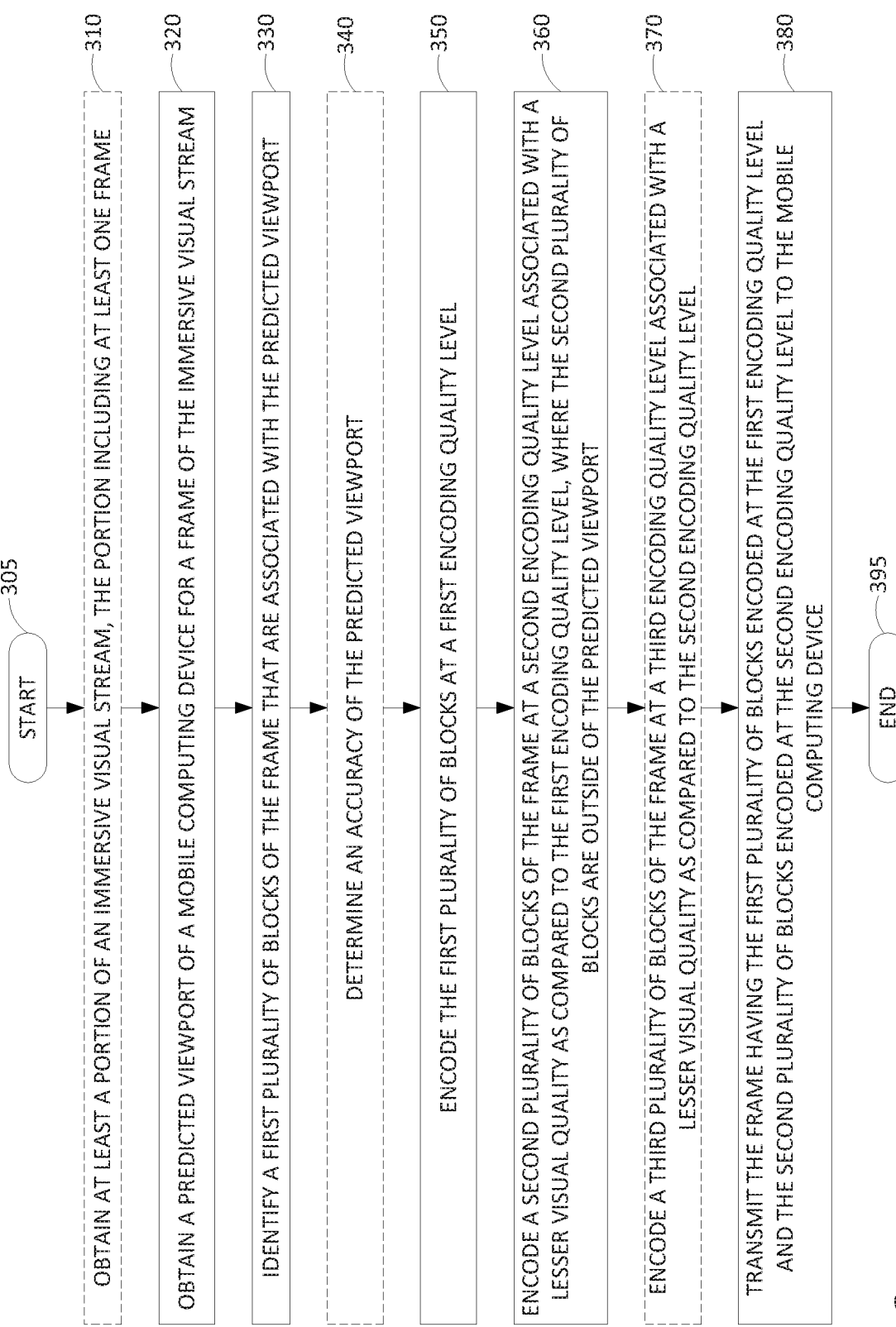
FIG. 3 illustrates a flowchart of an example method for encoding a first plurality of blocks of a frame of an immersive visual stream associated with a predicted viewport at a first encoding quality level and encoding a second plurality of blocks of the frame at a second encoding quality level.

In one example, access network 122 may include an edge server 108, which may comprise a computing system or server, such as computing system 400 depicted in FIG. 4, and may be configured to provide one or more operations or functions for encoding a first plurality of blocks of a frame of an immersive visual stream associated with a predicted viewport at a first encoding quality level and encoding a second plurality of blocks of the frame at a second encoding quality level, as described herein. For instance, an example method 300 for encoding a first plurality of blocks of a frame of an immersive visual stream associated with a predicted viewport at a first encoding quality level and encoding a second plurality of blocks of the frame at a second encoding quality level is illustrated in FIG. 3 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 106. Similarly, access network 122 may be in communication with one or more devices, e.g., device 132. Access networks 120 and 122 may transmit and receive communications between server 106, device 132, application server (AS) 104, other components of network 102, devices reachable via the Internet in general, and so forth. In one example, device 132 may comprise a mobile device, a cellular smart phone, a wearable computing device (e.g., smart glasses, a virtual reality (VR) headset, or the like), a laptop computer, a tablet computer, or the like (broadly a "mobile computing device"). In one example, device 132 may comprise a computing system or device, such as computing system 400 depicted in FIG. 4, and may be configured to provide one or more operations or functions in connection with examples of the present disclosure for encoding a first plurality of blocks of a frame of an immersive visual stream associated with a predicted viewport at a first encoding quality level and encoding a second plurality of blocks of the frame at a second encoding quality level.

In one example, server 106 may comprise a network-based server for immersive visual streaming. In this regard, server 106 may comprise the same or similar components as those of AS 104 and may provide the same or similar functions. Thus, any examples described herein with respect to AS 104 may similarly apply to server 106, and vice versa. In particular, server 106 may be a component of an immersive visual streaming system operated by an entity that is not a telecommunications network operator. For instance, a provider of an immersive visual streaming system may operate server 106 and may also operate edge sever 108 in accordance with an arrangement with a telecommunication service provider offering edge computing resources to third-parties. However, in another example, a telecommunication network service provider may operate network 102 and access network 122, and may also provide an immersive visual streaming system via AS 104 and edge server 108. For instance, in such an example, the immersive visual streaming system may comprise an additional service that may be offered to subscribers, e.g., in addition to network access services, telephony services, traditional television services, and so forth.

In an illustrative example, an immersive visual streaming system may be provided via AS 104 and edge server 108. In one example, user 192 may engage an application on device 132 (e.g., a "mobile computing device") to establish one or more sessions with the immersive visual streaming system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between device 132 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, device 132 may communicate with access network 122, network 102, the Internet in general, etc., via a WLAN that interfaces with access network 122.

In the example of FIG. 1, device 132 of user 192 may establish a session with edge server 108 for obtaining an immersive visual stream, which may be obtained as a sequence of frames and/or in chunks comprising a sequence of frames. For illustrative purposes, the immersive visual stream may comprise a 360-degree panoramic video. In this regard, an example frame 170 is illustrated in FIG. 1. In the illustrative example, the frame 170 may comprise a spherical frame providing a 360-degree (in azimuth and elevation) panorama. In one example, the edge server 108 may store a copy of the immersive visual stream (e.g., for a recorded video program). In another example, the edge server 108 may obtain the immersive visual stream (e.g., the frames thereof) from a centralized server for distributing immersive visual streams. For instance, AS 104 or server 106 may comprise such a centralized server.

Device 132 may comprise a wearable device which may include sensors for determining yaw, pitch, and roll parameters (e.g., along x, y, and z axes as illustrated in FIG. 1). For experiencing a 360-degree video, the device 132 may translate the x, y, and z parameters into a viewport 150. For instance, the viewport 150 may comprise a projection of the field-of-view (FoV) on the surface of a sphere 160 in the direction of a vector comprising the detected yaw, pitch, and roll (x, y, z). In one example, the frame 170 may comprise visual information corresponding to a sphere 160. For instance, spherical visual information captured via a 360-degree camera may be transformed into frame 170 via equirectangular projection, or the like. When receiving and rendering frame 170 for presentation, device 132 may determine the viewport 150, may identify portions of the frame 170 corresponding to the viewport 150, may decode the portions of the frame corresponding to the viewport 150 (if encoded), and may render the portions of the frame 170 via display components of the device 132 (e.g., one or more display screens).

In accordance with the present disclosure, the frame 170 may be encoded in a plurality of blocks 175 (e.g., m×n blocks; in this example, 8×16=128 blocks). As described above, the encoding of each block may be in accordance with a predicted viewport. The predicted viewport may be predicted for a time when it is anticipated that the frame 170 will be played-out (the "playback time" of frame 170). In one example, the predicted viewport is calculated by the edge server 108. To illustrate, the edge server 108 may obtain viewport traces from device 132. For instance, device 132 may periodically send actual measured viewport information (e.g., recent viewport information) to edge server 108, such as yaw, pitch, and roll measurements, and in some cases device location and/or camera position information, FoV information, and so forth. Edge server 108 may then use the recent viewport information to calculate the predicted viewport for the anticipated playback time of frame 170. In one example, the recent viewport information (which may be referred to as a "viewport trace"), may be processed via a trained machine learning algorithm (MLA), e.g., a MLM, to output a predicted viewport. For instance, the recent viewport information may indicate a trajectory of the viewport in a general direction. It may be expected that the viewport movement is likely to continue in the same general direction as indicated by the trajectory, which may be quantified by the output of the MLM—the predicted viewport.

In one example, the predicted viewport may be further based upon heatmap and/or saliency map-based RoI identification. For instance, AS 104 may provide heatmap information, e.g., identification of a region or regions of the frame 170 that are most popular among prior users. Similarly, AS 104 may provide saliency map information, e.g., identification of a region or regions of the frame that are determined to be the most "salient" according to an image saliency detection algorithm (e.g., as applied to individual frames or a plurality of frames). In one example, edge server 108 (and other edge servers, if present, in the immersive visual streaming system) may utilize viewport traces to perform viewport-adaptive transcoding, and may also provide the viewport traces to AS 104 for aggregation and developing heatmaps for frames of the immersive visual stream (including frame 170). The saliency map information and heatmap information may be stored along with the immersive visual stream (where the immersive visual stream comprises recorded and stored content). The saliency map and/or heatmap-identified RoIs can then be used in conjunction with a user's viewport trajectory to further increase the accuracy of future viewport prediction. In one example, the saliency map and/or heatmap information may comprise additional inputs into a MLM for viewport prediction. In another example, a predicted viewport may be generated via the MLM and combined with the saliency map and/or heatmap information to modify the predicted viewport, e.g., to move a center of the predicted viewport toward a region or regions of the frame that are identified in the saliency map and/or heatmap information.

In one example, the edge server 108 may store previous predicted viewports (the prior calculated predicted viewports generated by edge server 108 for previous frames of the immersive visual stream) and compare the previous predicted viewports to actual viewports, which may be identified in the viewport trace(s) obtained from device 132, to generate a prediction accuracy. For instance, the prediction accuracy may be calculated using data from a sliding window, e.g., comprising the past second of viewport traces, the past two seconds of viewport traces, the past five seconds of viewport traces, etc. In one example, the edge server 108 may calculate a distance between a center of the actual viewport and the predicted viewport for that frame. The distance for each frame may then be averaged to generate an average distance (e.g., an error) that may be scaled into an accuracy score, or the predicted accuracy. In one example, the edge server 108 may apply a weighted moving average, e.g., to apply greater weight to the score from distances for more recent frames, as compared to frames further in the past. In any case, after the edge server 108 calculates the predicted viewport for frame 170, the edge server 108 may then transcode the frame accordingly. For example, the edge server 108 may select between a two-tier approach and a multi-tier approach as described above, e.g., depending upon whether the prediction accuracy is above or below a threshold accuracy.

In this regard, FIG. 2 illustrates examples of both a two-tier approach (example frame encoding 210) and a multi-tier approach (example frame encoding 220). In the example frame encoding 210 (two-tier) the blocks of the frame corresponding to or associated with the predicted viewport 215 (e.g., overlapping with, falling within, and/or near to the predicted viewport 215) are encoded at the highest encoding quality level (e.g., level 5). The remainder of the blocks are encoded at a lower encoding quality level (e.g., the lowest encoding quality level), indicated as encoding quality level 1. In the example frame encoding 220 (multi-tier) the blocks of the frame corresponding to or associated with the predicted viewport 225 are encoded at the highest encoding quality level, e.g., level 5. For illustrative purposes, it may be assumed that user 192 is moving the viewport 225 toward the left as facing the page (e.g., determined by edge server 108 from viewport trace(s)). The next highest encoding quality level, level 4, may be assigned to blocks that are very close to the predicted viewport and that are on the left hand side of the predicted viewport 225. The edge server 108 may also decrease the assigned encoding quality level to blocks that are further away from the predicted viewport 225, e.g., encoding quality levels 3, 2, and 1 as shown.

In one example, the assignment and application of encoding quality levels to blocks may also be affected by the prediction accuracy. For instance, when the prediction is more accurate, encoding quality level 1 may be assigned to more blocks, such as those marked with encoding quality level 2 (e.g., because it is more likely that these blocks will not be consumed by the viewer). On the other hand, if the prediction accuracy becomes worse, more blocks may be encoded at higher encoding quality levels. For example, blocks with encoding quality level 3 may be adjusted to encoding quality level 4. It should also be noted that the assignment of encoding quality levels is also affected by the available network bandwidth to deliver the frame. For instance, if the network throughput decreases, the edge server 108 may reduce the encoding quality level assigned to each block, e.g., by one level for mild throughput restriction, by two levels for more significant network bandwidth reductions, etc.

Continuing with the present example in reference to FIG. 1, the edge server 108 may transmit the frame 170 containing the applicable encoding to device 132. Device 132 may buffer and/or store the frame 170, and may render the frame 170 for display following the presentation/display of the previous frame in the sequence of frames of the immersive visual stream. Although the frame 170 may contain viewport-adaptive encoding in accordance with the predicted viewport, when rendering the frame for display, the device 132 may select those blocks corresponding to the current, actual viewport. If the predicted viewport corresponds to or is close to the actual viewport, the user 192 may experience the portion of the frame with a higher visual quality. On the other hand, if the predicted viewport was not accurate and the actual viewport does not overlap with the predicted viewport (or only slightly overlaps), the user 192 may still experience the portion of the frame 170 at a lower visual quality (or qualities).

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 106, or may be provided by AS 104 in conjunction with server 106. For instance, AS 104 and server 106 may be configured in a load balancing arrangement, or may be configured to provide for backups or redundancies with respect to each other, and so forth. In still another example, instead of immersive visual streaming from servers storing immersive visual content, the streaming may be device-to-device. For instance, edge server 108 and AS 104 and/or server 106 may provide similar functions in support of streaming of immersive visual content from another mobile computing device (or other user endpoint device, such as a desktop computer, a smart television, etc.) that is capable of capturing immersive visual content (e.g., 360-degree video or non-360-degree panoramic video) to device 132. For example, another person may travel to an interesting destination and may wish to share an immersive visual stream captured from the destination with user 192, e.g., in real-time or near-real-time. In such an example, the immersive visual stream may be generated by the other endpoint device and forwarded to edge server 108, where edge server 108 may transcode frames and forward to device 132 in accordance with the present disclosure, (e.g., performing the operations of the example method 300 of FIG. 3, and/or as described elsewhere herein).

In addition, it should again be noted that a spherical or nearly complete spherical "360-degree video" is just one example of an immersive visual stream in accordance with the present disclosure. For instance, in another example, a "360-degree video" may comprise a cylindrical panorama covering 360 degrees in azimuth (horizontal) and less than 360 degrees in elevation/vertically (e.g., 90 degrees of elevation in any given azimuthal direction). In another example, the immersive visual stream may comprise less than 360-degree panoramic video, such as 270 degrees (cylindrically) in azimuth, 230 degrees in azimuth, etc. As noted above, other examples may include volumetric video (e.g., voxel-based volumetric video). Thus, these and other modifications are all contemplated within the scope of the present disclosure.

FIG. 3 illustrates a flowchart of an example method 300 for encoding a first plurality of blocks of a frame of an immersive visual stream associated with a predicted viewport at a first encoding quality level and encoding a second plurality of blocks of the frame at a second encoding quality level, in accordance with the present disclosure. In one example, the method 300 is performed by a component of the system 100 of FIG. 1, such as by edge server 108, and/or any one or more components thereof (e.g., a processor, or processors, performing operations stored in and loaded from a memory), or by edge server 108 in conjunction with one or more other devices, such as device 132, AS 104 or server 106, and so on. In one example, the steps, functions, or operations of method 300 may be performed by a computing device or system 400, and/or processor 402 as described in connection with FIG. 4 below. For instance, the computing device or system 400 may represent any one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310 or to step 320.

At optional step 310, the processing system (e.g., of an edge server) may obtain at least a portion of an immersive visual stream, the at least the portion including at least one frame. For instance, the portion of the immersive visual stream may be obtained from a centralized server for distributing immersive visual streams. In one example, the centralized server and the edge server may comprise components of a content distribution network (CDN). In one example, the immersive visual stream may comprise, for example, 360-degree video, non-360-degree panoramic video (e.g., less than a full 360-degrees in azimuth, elevation, or both), volumetric video, or any visual stream where field of view/viewport of a client device/mobile computing device is less than the entire frame. In addition, "video" can be recorded imagery, animation/computer generated imagery, a combination thereof, and so forth. In another example, the present disclosure may apply to a visual stream comprising "regular" video, e.g., where the client device/mobile computing device may render and display the entire frame, but where there may be particular regions of focus, which may be determined via a viewer-facing camera which may be used by the processing system for gaze tracking. For instance, the "viewport" may be considered the region of primary user focus, and regions outside of the region of primary focus may be considered outside of the viewport, although these regions may still technically be within the FoV of the user. In one example, optional step 310 may include decoding the portion of the immersive visual stream (e.g., when the version of the immersive visual stream obtained by the processing system at optional step 310 is encoded, such as in accordance with H.264/AVC, H.265/HEVC, MPEG-4, etc.).

At step 320, the processing system obtains a predicted viewport of a mobile computing device for a frame of the immersive visual stream. For instance, the mobile computing device may send viewport traces comprising a sequence of viewports for a sequence of frames of the immersive visual stream to the processing system (of the edge server) periodically or according to a different schedule, opportunistically (e.g., when network bandwidth fluctuates, viewport traces may be sent when network bandwidth is relatively higher), in response to a request from the processing system, etc. The processing system at step 320 may calculate the predicted viewport in accordance with a plurality of previous viewports (e.g., viewport trace(s)) of the mobile computing device for a plurality prior frames of the immersive visual stream. In one example, the calculation of the predicted viewport may be via trained machine learning algorithm (MLA), e.g., a "machine learning model" (MLM), or other predictive algorithm.

In one example, the predicted viewport is calculated further based upon at least one of historical viewport information regarding previous viewports with respect to the frame of other mobile computing devices that have experienced the immersive visual stream or salient portions of the frame as determined in accordance with an image saliency detection algorithm. In one example, the plurality of previous viewports may correspond to a "trajectory" of the viewport. In one example, step 320 may include, in addition to calculating a predicted viewport, calculating a trajectory of the viewport, e.g., a vector indicating a magnitude (e.g., speed of movement) and direction.

It should be noted that in another example, the mobile computing device may calculate its own predicted viewport, and report the predicted viewport to the processing system (e.g., to the edge server). In one example, the mobile computing device may provide a predicted viewport based upon recent viewports, where the processing system then takes the predicted viewport (as calculated by the client device) and integrates the mobile computing device's prediction with historical viewport information from other devices and/or image saliency information to come up with a final predicted viewport that may be used for encoding in accordance with the following steps. In other words, the processing system may take into consideration the mobile computing device's prediction, but may modify it, if warranted, based upon additional knowledge of historical viewership and what is "salient" in the frame and/or one or more upcoming frames.

In one example, step 320 may also include calculating a viewport trajectory. For example, as noted above, the trajectory may be determined in accordance with a plurality of previous viewports of the mobile computing device for a plurality prior frames of the immersive visual stream (e.g., via the same or a different MLM as the MLM for calculating the predicted viewport) or via a similar predictive technique. Similarly, the trajectory may be further determined based upon at least one of: (1) historical viewport information regarding previous viewports with respect to the frame of other mobile computing devices that have experienced the immersive visual stream or (2) salient portions of the frame as determined in accordance with an image saliency detection algorithm. For instance, viewport trace(s) of the mobile computing device may tend to indicate that the viewport (and correspondingly, a viewer's head and/or eyes) is moving in a particular direction with a particular speed. However, saliency map and/or heatmap information available to the processing system may indicate that there is a particular popular and/or salient portion of the frame. For instance, there may be a bright explosion visible in a particular region of the frame, an object may appear to be headed right towards the camera from a particular direction that has historically tended to garner most users' attentions, and so forth. Thus, the processing system may determine that the trajectory of the viewport may tend to track towards this region.

At step 330, the processing system identifies a first plurality of blocks of a frame of the immersive visual stream that are associated with the predicted viewport. For instance, the mobile computing device may indicate to the processing system the FoV of the mobile computing device, or the processing system may otherwise be aware of the FoV/display capabilities of the mobile computing device. As such, the processing system may determine the direction (e.g., yaw, pitch, roll) and the bounds of the FoV to define the viewport. The processing system may then determine which blocks of the frame correspond to the viewport. For instance, the frame may be stored in a format which indicates the spatial relationship among blocks (e.g., according to an equirectangular projection). In addition, the viewport may be translated/mapped into corresponding regions/blocks according to the equirectangular projection, or a similar positional methodology. In one example, a block of the frame comprises a spatially adjacent group of pixels or voxels within the frame. In one example, the block comprises a macro-block. In another example, the block comprises a micro-block or sub-macro-block.

At optional step 340, the processing system may determine an accuracy of the predicted viewport. For instance, the processing system may store predicted viewports for previous frames and may obtain actual viewport information, e.g., in one or more viewport traces from the mobile computing device. The processing system may then calculate a respective distance between a center of the actual viewport and the previously predicted viewport for each frame. The distance for each frame may then be averaged to generate an average distance (e.g., an error) that may be scaled into an accuracy score, or the predicted accuracy. In one example, the edge server 108 may apply a weighted moving average, e.g., to apply greater weight to the score from distances for more recent frames, as compared to frames further in the past. In one example, step 340 may include determining whether the prediction accuracy is above or below (or equal to) a threshold accuracy (e.g., 80%, 90%, 95%, etc.). The determination of whether the prediction accuracy is above or below the threshold may indicate whether the processing system may select a first type of encoding scheme (e.g., two-tier encoding) or a second type of encoding scheme (e.g., multi-tier encoding).

At step 350, the processing system, encodes the first plurality of blocks at a first encoding quality level. In one example, the first plurality of blocks is encoded at a highest encoding quality level that is supportable according to a network bandwidth, e.g., a channel quality experienced by the mobile computing device. In one example, the channel quality may be reported by the mobile computing device to the processing system. For instance, the mobile computing device may calculate a throughput based upon the time of the processing system (e.g., of the edge server) sending one or more packets comprising the frame, the time to complete receiving of the one or more packets, respectively, the size(s) of the packets, etc.

At step 360, the processing system encodes a second plurality of blocks of the frame of the immersive visual stream at a second encoding quality level, where the second encoding quality level is associated with a lesser visual quality as compared to the first encoding quality level, and where the second plurality of blocks is outside of the predicted viewport. For instance, the second plurality of blocks comprises blocks of the frame other than the first plurality of blocks. In one example, both the first encoding quality level and the second encoding quality level are selected in accordance with the channel quality experienced by the mobile communication device. In an example when the prediction accuracy exceeds (and/or is equal to) a threshold accuracy, a two-tier encoding may be selected. As such, at step 360, the second plurality of blocks may comprise all blocks of the frame other than the first plurality of frames that are associated with the predicted viewport.

However, it should be noted that in one example, the processing system may still send less than all of the frame to the mobile computing device. For instance, for a panoramic video comprising a full 360-degrees in azimuth (e.g., horizontally), in one example, the processing system may send 270 degrees of visual information centered on the predicted viewport, 230 degrees of visual information, 180 degrees of visual information, etc. Where the prediction accuracy is less than (and/or equal to) the threshold accuracy, in one example, the second plurality of blocks may comprise less than all of the blocks (other than the first plurality of blocks) of the frame that will be transmitted to the mobile computing device. In particular, in such case, the processing system may perform optional step 370.

At optional step 370, the processing system may encode a third plurality of blocks of the frame of the immersive visual stream at a third encoding quality level, where the third encoding quality level is associated with a lesser visual quality as compared to the second encoding quality level. For instance, the third plurality of blocks may be further outside of the predicted viewport as compared to the second plurality of blocks. Alternatively, or in addition, positions of the second plurality of blocks within the frame may be weighted towards a direction of a trajectory of the viewport, and positions of the third plurality of blocks within the frame may be weighted towards a direction opposite the trajectory of the viewport. For instance, as can be seen in the example frame encoding 220 of FIG. 2, there are additional higher-encoding quality level blocks to the left side of the predicted viewport 225 than to the right side (it may be recalled that the viewport trajectory was assumed to be to the left, facing the page).

At step 380, the processing system transmits the frame having the first plurality of blocks encoded at the first encoding quality level and the second plurality of blocks encoded at the second encoding quality level (and in one example, the third plurality of bocks encoding at the third encoding quality level) to the mobile computing device.

At step 395, the method 300 ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 310-380, steps 320-380, etc. In another example, the method 300 may include storing the frame (and additional frames and/or chunks of the immersive visual stream) at the edge server. The storing may be prior to performing the operations of steps 320-380, or may be after step 380. For instance, the immersive visual stream, or at least a portion thereof, may be stored for other users who may be interested in experiencing the immersive visual stream via the respective mobile computing devices that may be served by the processing system. In still another example, the method 300 may include performing the steps 320-380 for a plurality of different users and/or mobile computing devices. For instance, the immersive visual stream may be a live or near-live stream that may be experienced simultaneously by multiple users via the processing system (e.g., of an edge server) and/or via other edge servers. Since each of these users may have a unique viewport, the processing system may perform separate viewport predictions and may apply unique viewport-adaptive encodings for each mobile computing device. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1, or described in connection with the example of FIG. 2 and/or the method 300 of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for encoding a first plurality of blocks of a frame of an immersive visual stream associated with a predicted viewport at a first encoding quality level and encoding a second plurality of blocks of the frame at a second encoding quality level, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for encoding a first plurality of blocks of a frame of an immersive visual stream associated with a predicted viewport at a first encoding quality level and encoding a second plurality of blocks of the frame at a second encoding quality level (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for encoding a first plurality of blocks of a frame of an immersive visual stream associated with a predicted viewport at a first encoding quality level and a encoding second plurality of blocks of the frame at a second encoding quality level (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:

obtaining, by a processing system including at least one processor, a predicted viewport of a mobile computing device for an immersive visual stream, wherein the predicted viewport is for a first future time period for which the predicted viewport is predicted, wherein the predicted viewport is calculated in accordance with a plurality of previous viewports of the mobile computing device for a plurality prior frames of the immersive visual stream;

identifying, by the processing system, a first plurality of blocks of a frame of the immersive visual stream that is associated with the predicted viewport;

encoding, by the processing system, the first plurality of blocks at a first encoding quality level;

determining, by the processing system, that an accuracy associated with the predicted viewport is below a threshold, wherein the accuracy associated with the predicted viewport is determined to be below the threshold based upon a difference between a previous predicted viewport and an actual viewport when a second future time period associated with the previous predicted viewport comes to pass, wherein the second future time period precedes the first future time period;

selecting, by the processing system, a multi-tier encoding scheme, from among the multi-tier encoding scheme and a two-tier encoding scheme, in response to the determining that the accuracy associated with the predicted viewport is below the threshold;

encoding, by the processing system in response to the multi-tier encoding scheme that is selected, a second plurality of blocks of the frame of the immersive visual stream at a second encoding quality level, wherein the second encoding quality level is associated with a lesser visual quality as compared to the first encoding quality level, wherein the second plurality of blocks is outside of the predicted viewport;

encoding, by the processing system in response to the multi-tier encoding scheme that is selected, a third plurality of blocks of the frame of the immersive visual stream at a third encoding quality level, wherein the third encoding quality level is associated with a lesser visual quality as compared to the second encoding quality level, wherein the third plurality of blocks is further outside of the predicted viewport as compared to the second plurality of blocks; and transmitting, by the processing system, the frame having the first plurality of blocks encoded at the first encoding quality level, the second plurality of blocks encoded at the second encoding quality level, and the third plurality of blocks encoded at the third encoding quality level, to the mobile computing device.

2. The method of claim 1, wherein the immersive visual stream comprises:
- a video having dimensions that exceed display capabilities of the mobile computing device;
- a 360 degree video; or
- a volumetric video.

3. The method of claim 1, wherein a block of the frame comprises a spatially adjacent group of pixels or voxels within the frame.

4. The method of claim 3, wherein the block comprises a macroblock.

5. The method of claim 3, wherein the block comprises a micro-block.

6. The method of claim 1, wherein the second plurality of blocks comprises blocks of the frame other than the first plurality of blocks.

7. The method of claim 1, wherein the first encoding quality level and the second encoding quality level are selected in accordance with a channel quality experienced by the mobile communication device.

8. The method of claim 1, wherein the first encoding quality level, the second encoding quality level, and the third encoding quality level are selected in accordance with a channel quality experienced by the mobile communication device.

9. The method of claim 1, wherein positions of the second plurality of blocks within the frame are weighted towards a direction of a trajectory of the predicted viewport, and wherein positions of the third plurality of blocks within the frame are weighted towards a direction opposite the trajectory of the predicted viewport.

10. The method of claim 9, wherein the trajectory is determined in accordance with a plurality of previous viewports of the mobile computing device for a plurality prior frames of the immersive visual stream.

11. The method of claim 10, wherein the trajectory is further determined based upon at least one of:
- historical viewport information regarding previous viewports with respect to the frame for other mobile computing devices that have experienced the immersive visual stream; or
- salient portions of the frame as determined in accordance with an image saliency detection algorithm.

12. The method of claim 1, wherein the predicted viewport is further based upon at least one of:
- historical viewport information regarding previous viewports with respect to the frame for other mobile computing devices that have experienced the immersive visual stream; or
- salient portions of the frame as determined in accordance with an image saliency detection algorithm.

13. The method of claim 1, wherein the predicted viewport is obtained from the mobile computing device.

14. The method of claim 1, wherein the obtaining the predicted viewport comprises:
- calculating the predicted viewport based upon the plurality of previous viewports of the mobile computing device for the plurality prior frames of the immersive visual stream.

15. The method of claim 14, wherein the calculating the predicted viewport is further based upon at least one of:
- historical viewport information regarding previous viewports with respect to the frame for other mobile computing devices that have experienced the immersive visual stream; or
- salient portions of the frame as determined in accordance with an image saliency detection algorithm.

16. A device comprising:
- a processing system including at least one processor; and
- a computer-readable medium storing instructions which, when executed by the processing system, cause the processing system to perform operations, the operations comprising:
  - obtaining a predicted viewport of a mobile computing device for an immersive visual stream, wherein the predicted viewport is for a first future time period for which the predicted viewport is predicted, wherein the predicted viewport is calculated in accordance with a plurality of previous viewports of the mobile computing device for a plurality prior frames of the immersive visual stream;
  - identifying a first plurality of blocks of a frame of the immersive visual stream that is associated with the predicted viewport;
  - encoding the first plurality of blocks at a first encoding quality level;
  - determining that an accuracy associated with the predicted viewport is below a threshold, wherein the accuracy associated with the predicted viewport is determined to be below the threshold based upon a difference between a previous predicted viewport and an actual viewport when a second future time period associated with the previous predicted viewport comes to pass, wherein the second future time period precedes the first future time period;
  - selecting a multi-tier encoding scheme, from among the multi-tier encoding scheme and a two-tier encoding scheme, in response to the determining that the accuracy associated with the predicted viewport is below the threshold;
  - encoding, in response to the multi-tier encoding scheme that is selected, a second plurality of blocks of the frame of the immersive visual stream at a second encoding quality level, wherein the second encoding quality level is associated with a lesser visual quality as compared to the first encoding quality level, wherein the second plurality of blocks is outside of the predicted viewport;
  - encoding, in response to the multi-tier encoding scheme that is selected, a third plurality of blocks of the frame of the immersive visual stream at a third encoding quality level, wherein the third encoding quality level is associated with a lesser visual quality as compared to the second encoding quality level, wherein the third plurality of blocks is further outside of the predicted viewport as compared to the second plurality of blocks; and
  - transmitting the frame having the first plurality of blocks encoded at the first encoding quality level, the second plurality of blocks encoded at the second encoding quality level, and the third plurality of blocks encoded at the third encoding quality level, to the mobile computing device.

17. A non-transitory computer-readable medium storing instructions which, when executed by a processing system including at least one processor, cause the processing system to perform operations, the operations comprising:
- obtaining a predicted viewport of a mobile computing device for an immersive visual stream, wherein the predicted viewport is for a first future time period for which the predicted viewport is predicted, wherein the predicted viewport is calculated in accordance with a plurality of previous viewports of the mobile computing device for a plurality prior frames of the immersive visual stream;

identifying a first plurality of blocks of a frame of the immersive visual stream that is associated with the predicted viewport;

encoding the first plurality of blocks at a first encoding quality level;

determining that an accuracy associated with the predicted viewport is below a threshold, wherein the accuracy associated with the predicted viewport is determined to be below the threshold based upon a difference between a previous predicted viewport and an actual viewport when a second future time period associated with the previous predicted viewport comes to pass, wherein the second future time period precedes to the first future time period;

selecting a multi-tier encoding scheme, from among the multi-tier encoding scheme and a two-tier encoding scheme, in response to the determining that the accuracy associated with the predicted viewport is below the threshold;

encoding, in response to the multi-tier encoding scheme that is selected, a second plurality of blocks of the frame of the immersive visual stream at a second encoding quality level, wherein the second encoding quality level is associated with a lesser visual quality as compared to the first encoding quality level, wherein the second plurality of blocks is outside of the predicted viewport;

encoding, in response to the multi-tier encoding scheme that is selected, a third plurality of blocks of the frame of the immersive visual stream at a third encoding quality level, wherein the third encoding quality level is associated with a lesser visual quality as compared to the second encoding quality level, wherein the third plurality of blocks is further outside of the predicted viewport as compared to the second plurality of blocks; and transmitting the frame having the first plurality of blocks encoded at the first encoding quality level, the second plurality of blocks encoded at the second encoding quality level, and the third plurality of blocks encoded at the third encoding quality level, to the mobile computing device.

18. The non-transitory computer-readable medium of claim 17, wherein the immersive visual stream comprises:

a video having dimensions that exceed display capabilities of the mobile computing device;

a 360 degree video; or a volumetric video.

19. The non-transitory computer-readable medium of claim 17, wherein a block of the frame comprises a spatially adjacent group of pixels or voxels within the frame.

20. The non-transitory computer-readable medium of claim 19, wherein the block comprises a macroblock.

* * * * *